United States Patent
Frank et al.

(10) Patent No.: US 8,704,189 B2
(45) Date of Patent: Apr. 22, 2014

(54) SYSTEM AND METHOD FOR IONIZING RADIATION DETECTION

(75) Inventors: John M. Frank, Hartville, OH (US); J. Charles Cooper, Katy, TX (US)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 715 days.

(21) Appl. No.: 12/948,574

(22) Filed: Nov. 17, 2010

(65) Prior Publication Data

US 2011/0114848 A1     May 19, 2011

Related U.S. Application Data

(60) Provisional application No. 61/262,305, filed on Nov. 18, 2009.

(51) Int. Cl.
*H01J 47/12*     (2006.01)
(52) U.S. Cl.
USPC ......................................................... 250/374
(58) Field of Classification Search
USPC ......................................................... 250/374
See application file for complete search history.

(56) References Cited

U.S. PATENT DOCUMENTS

| | | |
|---|---|---|
| 2,474,851 A | 7/1949 | Liebson |
| 2,503,302 A | 4/1950 | Shore |
| 2,612,615 A | 9/1952 | Fehr et al. |
| 2,688,097 A | 8/1954 | Friedman |
| 2,715,195 A | 8/1955 | Friedman |
| 2,789,242 A | 4/1957 | Friedman et al. |
| 2,922,911 A | 1/1960 | Friedman |
| 2,978,603 A * | 4/1961 | Fite et al. ...................... 313/93 |
| 3,022,424 A | 2/1962 | Anton |
| 3,030,539 A * | 4/1962 | Di Ianni ........................ 313/93 |
| 3,338,653 A * | 8/1967 | Anton ............................ 445/38 |

(Continued)

FOREIGN PATENT DOCUMENTS

| | | |
|---|---|---|
| CN | 101290352 A | 10/2008 |
| EP | 1916697 A1 | 4/2008 |

(Continued)

OTHER PUBLICATIONS

Srdoc, Ing D. "An oxygen-quenched Geiger-Muller counter." Journal of Scientific Instruments, vol. 33, Issue 5, dated May 1956, pp. 185-186.

(Continued)

*Primary Examiner* — David Porta
*Assistant Examiner* — Djura Malevic
(74) *Attorney, Agent, or Firm* — Abel Law Group, LLP; Robert N. Young

(57) ABSTRACT

An ionizing radiation detection system can include a self-quenching sensing element having a substantially sealed enclosure containing a plurality of gases. The plurality of gases can include an ionizing gas to ionize in response to receiving a particle of ionizing radiation. The plurality of gases can also include a halogen quenching gas. In a particular embodiment, the plurality of gases can include an oxygen-containing gas in an amount of at least approximately 5% by pressure of a total pressure of the plurality of gases. In another particular embodiment, the partial pressure of the oxygen-containing gas can be from approximately 2666 Pa to approximately 16000 Pa. In another embodiment, the radiation detection system can include an anode having a composition that is more resistant to erosion by gasses within the sensing element.

11 Claims, 5 Drawing Sheets

(56) References Cited

U.S. PATENT DOCUMENTS

| | | | |
|---|---|---|---|
| 3,342,538 A | 9/1967 | Mitrofanov | |
| 3,710,166 A | 1/1973 | Perelman et al. | |
| 3,892,990 A | 7/1975 | Mitrofanov | |
| 3,903,444 A | 9/1975 | Tessler | |
| 4,354,135 A * | 10/1982 | Mitrofanov et al. | 313/93 |
| 4,359,661 A * | 11/1982 | Mitrofanov | 313/93 |
| 4,501,988 A * | 2/1985 | Mitrofanov et al. | 313/93 |
| 4,527,084 A | 7/1985 | Wakayama | |
| 4,684,806 A | 8/1987 | Mitrofanov | |
| 5,541,519 A | 7/1996 | Stearns et al. | |
| 5,614,722 A * | 3/1997 | Solberg et al. | 250/374 |
| 6,389,103 B2 | 5/2002 | Francke et al. | |
| 6,433,335 B1 | 8/2002 | Kronenberg et al. | 250/304 |
| 7,368,707 B2 * | 5/2008 | Croydon | 250/252.1 |
| 7,375,342 B1 * | 5/2008 | Wedding | 250/385.1 |
| 7,791,037 B1 * | 9/2010 | Wedding et al. | 250/374 |
| 8,134,129 B2 * | 3/2012 | Tokanai et al. | 250/361 R |
| 8,198,812 B1 * | 6/2012 | Wenzlaff et al. | 313/583 |
| 8,513,887 B1 * | 8/2013 | Wedding et al. | 313/582 |
| 8,519,350 B2 * | 8/2013 | McGregor et al. | 250/390.01 |
| 2008/0308747 A1 * | 12/2008 | Gordon et al. | 250/472.1 |
| 2009/0108212 A1 * | 4/2009 | Gordon et al. | 250/395 |
| 2009/0114828 A1 * | 5/2009 | Decker et al. | 250/364 |
| 2009/0255350 A1 * | 10/2009 | Decker | 73/863.12 |
| 2010/0071836 A1 * | 3/2010 | Watson | 156/89.12 |
| 2012/0217406 A1 * | 8/2012 | McGregor et al. | 250/361 R |

FOREIGN PATENT DOCUMENTS

| | | |
|---|---|---|
| JP | 62005192 A | 1/1987 |
| JP | 63132190 A | 6/1988 |
| JP | 2001165907 A | 6/2001 |

OTHER PUBLICATIONS

International Search Report and the Written Opinion for International Application No. PCT/US2010/057059 received from the International Searching Authority (ISA/KR) dated Jul. 15, 2011, 13 pages.

* cited by examiner

SYSTEM AND METHOD FOR IONIZING RADIATION DETECTION

CROSS-REFERENCE TO RELATED APPLICATION

This application claims priority under 35 U.S.C. §119(e) to U.S. Patent Application No. 61/262,305 entitled "System and Method for Ionizing Radiation Detection," by Frank et al., filed Nov. 11, 2009, which is assigned to the current assignee hereof and incorporated herein by reference in its entirety.

FIELD OF THE DISCLOSURE

The present disclosure is directed to ionizing radiation detection systems and methods of making and using such systems.

RELATED ART

Ionizing radiation detection systems are used in a variety of applications. For example, a Geiger counter can receive a particle of ionizing radiation and output an electrical pulse in response. Electrical pulses can be processed by associated electronics and may be registered as counts. Failure of an ionizing radiation detection system can be indicated when multiple counts are registered for a single particle of ionizing radiation or when no counts are registered for a particle of ionizing radiation. Such failure can hinder the use of these detection systems in industrial applications. Accordingly, the industry continues to need improvements in ionizing radiation detection systems.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

Figure 1:
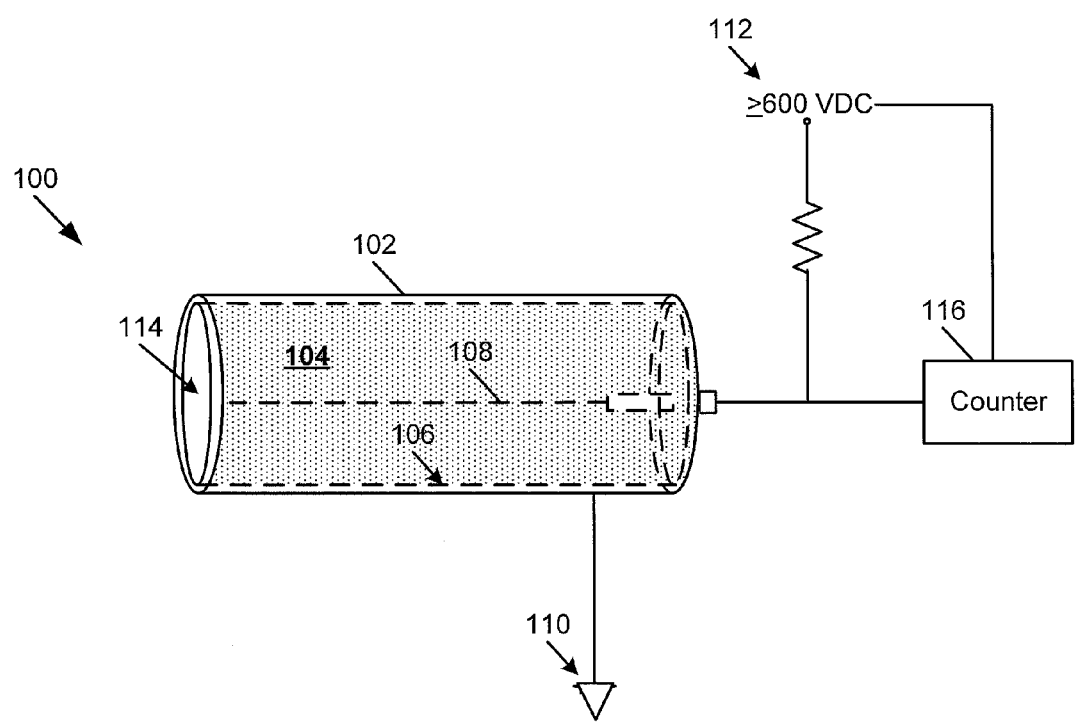
FIG. 1 is a diagram illustrating a particular embodiment of an ionizing radiation detection system.

Innovative teachings of the present disclosure will be described with particular reference to exemplary embodiments. However, it should be understood that this class of embodiments provides only a few examples of the many advantageous uses of the innovative teachings herein. In general, statements made in the present disclosure do not necessarily limit any of the various claimed articles, systems, or methods. Moreover, some statements may apply to some inventive features but not to others.

In the description below, a flow-charted technique may be described in a series of sequential actions. The sequence of the actions and the party performing the steps may be freely changed without departing from the scope of the teachings. Actions may be added, deleted, or altered in several ways. Similarly, the actions may be re-ordered or looped. Further, although processes, methods, algorithms or the like may be described in a sequential order, such processes, methods, algorithms, or any combination thereof may be operable to be performed in alternative orders. Further, some actions within a process, method, or algorithm may be performed simultaneously during at least a point in time (e.g., actions performed in parallel) or serially.

As used herein, the terms "comprises," "comprising," "includes," "including," "has," "having," or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

The use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single device is described herein, more than one device may be used in place of a single device. Similarly, where more than one device is described herein, a single device may be substituted for that one device.

An ionizing radiation detection system can include a sensing element that contains an ionizing gas. The sensing element can also include a cathode and an anode. Ionizing radiation passing into the sensing element can ionize a portion of the ionizing gas, thereby producing electrons and positively charged ions. The electric field created by the cathode and the anode can cause the positively charged ions to move toward the cathode and the electrons to move toward the anode. The ions can ionize other portions of the ionizing gas in an avalanche effect. The resulting cascade of electrons received by the anode can produce an electrical pulse that passes between electrodes that are coupled to the cathode and the anode. The electrical pulse can be counted or otherwise measured by a counter or other electronic equipment.

In embodiments described herein, a more reliable ionizing radiation detection can be realized. In a set of embodiments, the ionizing radiation detection system can include a sensing element, wherein the sensing element includes a plurality of gasses. The plurality of gasses can include an oxygen-containing gas. Unexpectedly, the oxygen-containing gas can improve the useful lifetime of an anode wire. In another set of embodiments, the anode can comprise a material that is more resistant to the gases, and in a particular embodiment, a plasma formed from the gases. Thus, the radiation detection system can be operated for a longer time period before that anode would fail. The sets of embodiments are described in more detail below. The set of embodiments related to the oxygen-containing gas are described before addressing the set of embodiments related to the anode composition.

FIG. 1 illustrates a schematic diagram of a particular embodiment of an ionizing radiation detection system 100. The system 100 includes a self-quenching sensing element 102, such as a Geiger-Mueller tube or other sensing element, having a substantially sealed enclosure adapted to contain a gas 104 at a substantially constant pressure. The sensing element 102 can be stainless steel, glass or another material that is relatively non-reactive with respect to gases inside of the sensing element 102. The sensing element 102 can have an inner surface 106 that is substantially coated with a cathode material, such as a metal, graphite, or another material. For example, the inner surface 106 can be electroplated with platinum. The inner surface 106 may include another material to achieve a desired property. For instance, the inner surface 106 may include boron when neutron-sensitivity is desired.

In addition, the sensing element 102 can include an anode 108 that is electrically isolated from the inner surface 106. The anode 108 can include an electrically conductive wire, such as an iron-containing wire a nickel-containing wire, or other metallic wire. In a particular embodiment, the anode 108 can include nickel, a nickel alloy, stainless steel, such as 17-7 stainless steel, 446 stainless steel, 316 stainless steel, 310 stainless steel, or another iron alloy. The sensing element 102 can include a window 114 that can be adapted to allow ionizing radiation to pass into an interior of the sensing element 102. The window 114 may include glass, mica, alumina, spinel, or another suitable material. As illustrated, the window 114 can be on an end of the sensing element 102. In another embodiment, the window 114 can be on a side of the sensing element 102.

The inner surface 106 of the sensing element 102 can be coupled to an electrode 110, and the anode 108 can be coupled to another electrode 112. A voltage can be supplied via the electrode 112, such that an electrical potential of at least 300 VDC, such as at least 600 VDC, can exist between the electrodes 110 and 112. In a particular embodiment, the voltage can be at least 800 VDC, such as 1050 VDC or greater. Electrical pulses generated by current flowing through the sensing element 102 can be measured or detected at an electronic device, such as a counter 116. The ionization detection system 100 can include additional electronics, such as a preamplifier, a discriminator, an audio amplifier, other electronics or any combination thereof.

The gas 104 contained by the sensing element 102 can include a plurality of gaseous constituents, including an ionizing gas, a quenching gas and an oxygen-containing gas. The ionizing gas can ionize in response to receiving a particle of ionizing radiation. The ionizing gas can include, for example, a noble gas, such as neon gas, argon gas, helium gas, xenon gas, krypton gas or any combination thereof. In an illustrative embodiment, the ionizing gas can include a mixture of noble gases, where a majority of the ionizing gas is noble gas having a higher ionization potential than a minority noble gas. In an example, the ionizing gas can include a Penning mixture of neon (having an ionization potential of approximately 21.5 eV) and argon (having an ionization potential of approximately 15.8 eV). In a particular embodiment, the ionizing gas can include approximately 0.1% by mass of the minority gas, such as argon.

The quenching gas that is included in the gas 104 can prevent spurious electrical pulses by interacting with positively charged noble gas ions produced as a result of ionizing radiation passing into the sensing element 102. For instance, when the ionizing gas includes neon and argon, positively charged argon ions produced by the ionizing radiation would reach the inner surface 106 and become neutral argon atoms in an excited state. As the excited argon atoms returned to the ground state, they would emit photons that cause spurious counts unrelated to the ionizing radiation that the sensing element 102 is intended to detect. When a quenching gas is used, however, the positively charged argon ions, or other ionizing gas ions, can collide with the quenching gas, producing positively charged quenching gas ions and neutral argon atoms. The quenching gas ions move to the cathode and receive electrons, yielding neutral quenching gas atoms in an excited state. The quenching gas atoms may lose their energy by forming quenching gas molecules, rather than by emitting photons. The quenching gas can have a lower ionization potential than the ionizing gas, such as a lower ionization potential than a minority noble gas. In a particular embodiment, the quenching gas can include a halogen gas. For instance, the quenching gas can include diatomic bromine. In another example, the quenching gas can include diatomic chlorine.

In a particular embodiment, the oxygen-containing gas that is included in the gas 104 can include air. The air can include a mixture of components in addition to oxygen, such as nitrogen, water vapor, carbon dioxide, argon, another gas, or any combination thereof. In another embodiment, the air can consist essentially of dry air that is substantially free of water vapor. Alternatively, the oxygen-containing gas can include substantially pure diatomic oxygen. In another embodiment, the oxygen-containing gas can include ozone. The oxygen-containing gas can have a lower ionization potential than the quenching gas. For instance, diatomic oxygen (having an ionization potential of approximately 12.0 eV) can be used when diatomic bromine (having an ionization potential of approximately 12.8 eV) is used as a quenching gas.

In a particular embodiment, the ionizing gas can be present in an amount of from approximately 80% by pressure to approximately 99.8% by pressure of a total pressure of the gas 104. The quenching gas can be present in amount of from approximately 0.1% by pressure to approximately 1% of the total pressure of the gas 104. The oxygen-containing gas can be present in an amount of from approximately 1% by pressure to approximately 20% of a total pressure of the gas 104. For instance, where the oxygen-containing gas includes substantially pure diatomic oxygen, the oxygen-containing gas can be present in an amount of at least approximately 3% by pressure of a total pressure of the gas 104, such as at least approximately 5% by pressure of the total pressure. In another example, where the oxygen-containing gas includes air, the oxygen-containing gas can be present in an amount of at least approximately 10% by pressure of a total pressure of the gas 104, such as at least 12.5% by pressure of the total pressure.

In another particular embodiment, the ionizing gas can be present in an amount of from 13332 Pa (100 mm Hg) to approximately 101325 (760 mm Hg). The quenching gas can be present in an amount of from approximately 67 Pa (0.5 mm Hg) to approximately 1333 Pa (10 mm Hg). Further, the oxygen-containing gas can be present in an amount of from approximately 1333 Pa (10 mm Hg) to approximately 26667 Pa (200 mm Hg). For instance, where the oxygen-containing gas includes substantially pure diatomic oxygen, the oxygen-containing gas can be present in an amount of from approximately 1333 Pa (10 mm Hg) to approximately 6666 Pa (50 mm Hg). In another example, where the oxygen-containing gas includes air, the oxygen-containing gas can be present in an amount of from approximately 5332 Pa (40 mm Hg) to approximately 26667 Pa (200 mm Hg).

In an example, the gas 104 can have a total pressure that is less than atmospheric pressure, such as less than approximately 66661 Pa (500 mm Hg). TABLE 1 illustrates proportions of components of non-air portions (i.e., ionizing and quenching portions) of the gas 104 and components of air included in the gas 104, when the gas has a total pressure of 63061.5 Pa (473 mm Hg).

TABLE 1

Partial Pressures of Gas Components Including Air

| Component | Non-air (Pa) | Air (Pa) | Total (Pa) |
|---|---|---|---|
| Ar | 28.0 | 62.7 | 90.6 |
| Ne | 56114 | 0.00 | 56114 |
| $Br_2$ | 252.0 | 0.00 | 252.0 |
| $O_2$ | 0.00 | 1391.9 | 1391.9 |
| $N_2$ | 0.00 | 5186.2 | 5186.2 |
| $CO_2$ | 0.00 | 2.7 | 2.7 |
| $H_2O$ | 0.00 | 24.0 | 24.0 |
| Total | 56394 | 6667.5 | 63061.5 |

In the example illustrated above, the plurality of gases included in the gas 104 includes approximately 10.5% by pressure of air and approximately 0.4% by pressure of diatomic bromine, the quenching gas. Further, the plurality of gases included in the gas 104 includes approximately 89% by pressure of ionizing gas (non-air argon and neon). The plurality of gases included in the gas 104 includes 0.1% by pressure of argon.

In an illustrative, non-limiting embodiment, the gas 104 can include another constituent to achieve a desired property. For example, if neutron sensitivity is desired, the gas 104 can include $BF_3$ gas or $^3He$ gas in addition to the other previously described gases.

Figure 2:
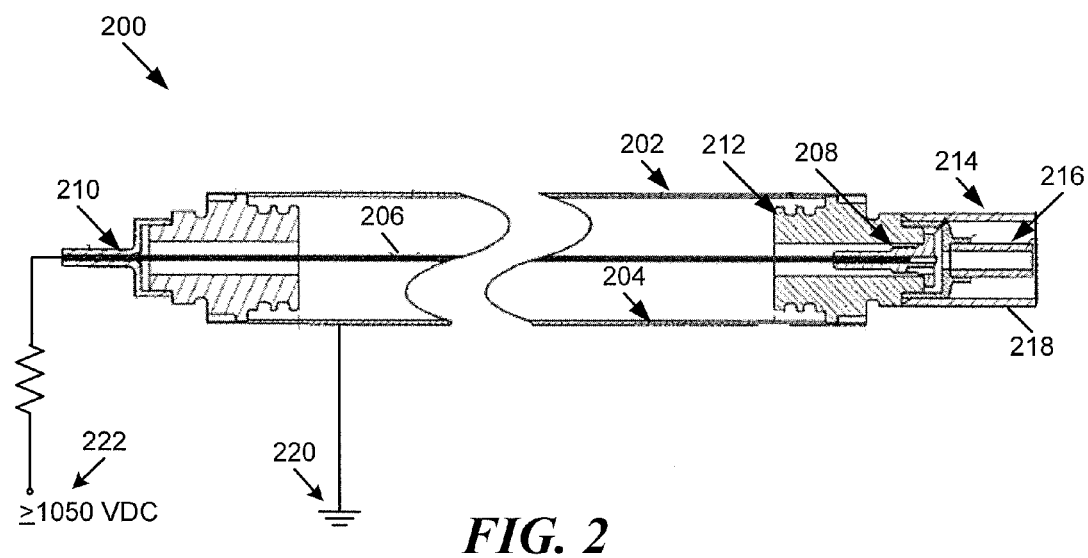
FIG. 2 is a diagram illustrating another particular embodiment of an ionizing radiation detection system.

FIG. 2 illustrates another particular embodiment of an ionizing radiation detection system sensing element 200. The sensing element 200 includes an enclosure 202 having a coated inner surface 204 and an anode wire 206. The anode wire 206 can extend from an anode assembly 208 and an external anode support 210. In an illustrative embodiment, a ceramic portion 212 protects the anode assembly 208 from corrosion, heat or another undesired element and electrically isolates the anode wire 206 from the enclosure 202 and the inner surface 204. The enclosure 202 can be coupled to an electrode 220, and the anode 206 can be coupled to another electrode 222. An electrical potential of at least 300 VDC can exist between the electrodes 220 and 222. The sensing element 200 can also include an end window 216. The window 216 can be transparent, translucent or any combination thereof.

The sensing element 200 is adapted to hold a gas at a substantially constant pressure at a given temperature. The gas can include a plurality of gaseous constituents, including an inert ionizing gas, a halogen quenching gas, and an oxygen-containing gas. The oxygen-containing gas can be present in an amount of at least approximately 3% by pressure of a total pressure of the plurality of gaseous constituents. TABLE 2 illustrates example proportions of components of the gas 104 having a total pressure of approximately 53329 Pa (400 mm Hg), in which the oxygen-containing gas includes substantially pure diatomic oxygen.

TABLE 2

Partial Pressures of Gas Components with Substantially no Air

| Component | Pressure (Pa) |
|---|---|
| Ne | 50334 |
| Ar | 53 |
| $Br_2$ | 266 |
| $O_2$ | 2666 |
| Total | 53329 |

In the example illustrated above, the plurality of gaseous constituents includes approximately 5% by pressure of diatomic oxygen and approximately 0.45% by pressure of diatomic bromine, the quenching gas. Further, the plurality of gaseous constituents includes approximately 94% by pressure of ionizing gas (non-air argon and neon). The plurality of gases includes 0.1% by pressure of argon.

Figure 3:
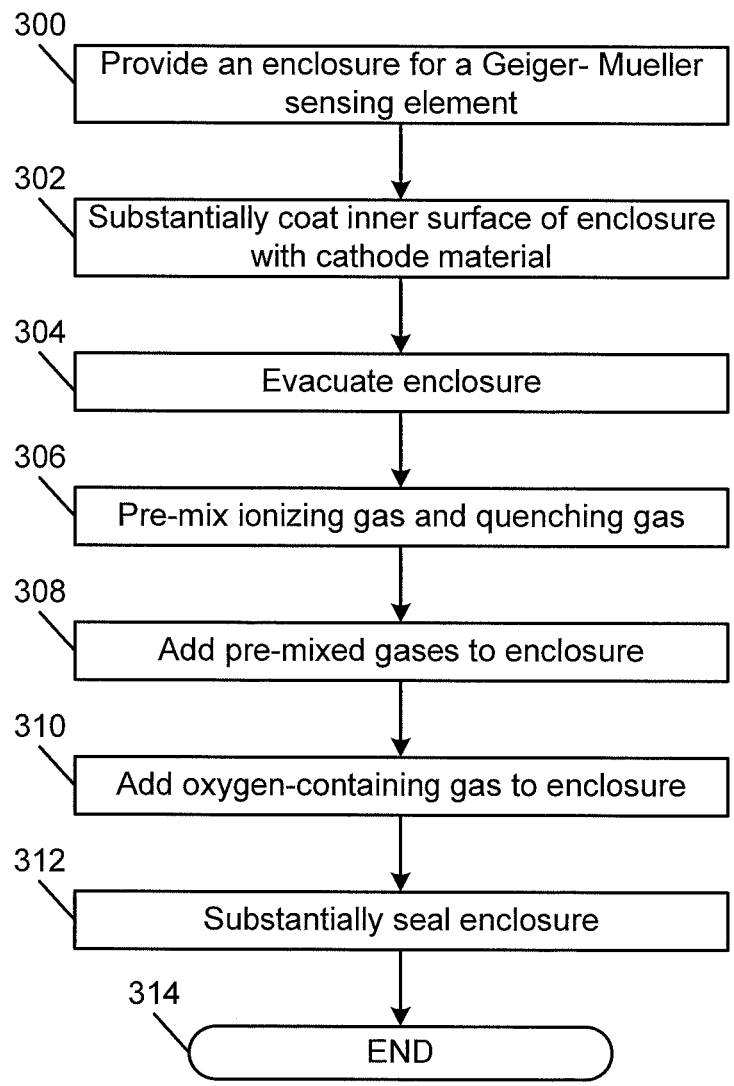
FIG. 3 is a flow diagram illustrating a particular embodiment of a method of making an ionizing radiation detection system.

In a particular embodiment, a sensing element can be made according to a method illustrated in FIG. 3. At block 300, a sensing element, such as a Geiger-Mueller tube, can be provided. The sensing element includes an enclosure having an anode wire electrically isolated from an inner surface of the enclosure. Moving to block 302, the inner surface of the enclosure can be substantially coated with a cathode material. Proceeding to block 304, the enclosure can be evacuated. Continuing to block 306, in a particular embodiment, an ionizing gas, and a quenching gas can be pre-mixed. Advancing to block 308, the pre-mixed gases can be added to the enclosure.

At block 310, an oxygen-containing gas is added to enclosure. A total pressure of the ionizing gas, quenching gas and oxygen-containing gas can be less than atmospheric pressure. The oxygen-containing gas is present in an amount as previously described. Moving to block 312, the enclosure is substantially sealed. The method can terminate at 314.

In accordance with particular embodiments disclosed herein, an ionizing radiation detection system is disclosed that includes a self-quenching Geiger counter sensing element having a substantially sealed enclosure containing a plurality of gases. The plurality of gases includes an ionizing gas to ionize in response to receiving a particle of ionizing radiation, a halogen quenching gas and an oxygen-containing gas in an amount of at least approximately 3% by pressure of a total pressure of the plurality of gases. For example, the oxygen-containing gas can be present in an amount of at least approximately 5% by pressure of the total pressure.

In another set of embodiments, the ionizing radiation detection system can include an anode having a composition that is more resistant to gases, including plasmas formed from the gases, within a sensing element of the ionizing radiation detection system. In a particular embodiment, the anode can be in the form of a wire. Referring to FIG. 2, anode wire 206 can include a noble metal, nickel, or any combination thereof. In a particular embodiment, the anode includes platinum. In another embodiment, the anode includes palladium or gold. In yet another embodiment, the anode includes ruthenium, rhenium, iridium, osmium, each of which is capable of forming a conductive metal oxide. In another particular embodiment when the anode includes nickel, the nickel can be the form of an elemental metal or as part of a nickel alloy. The alloy can include a refractory metal, such as titanium, tantalum, tungsten, niobium or another element metal having a melting point of at least 1400° C. In another embodiment, a different metal can be used within the material alloy. In a more particular embodiment, a nickel-titanium alloy can be used.

In a particular embodiment, the anode wire 206 can consist essentially of the noble metal, nickel, or an alloy thereof. In another embodiment, the anode wire 206 can include an iron-containing wire with a material including the noble metal, nickel, or an alloy thereof covering the iron-containing wire. The selection of the iron-containing wire and any of the foregoing metal coatings may in part depend on the coefficient of thermal expansion ("CTE"). Because a plasma can form within the Geiger-Mueller tube, the anode can be exposed to locally high temperatures. When the iron-containing wire and the metal coating have CTEs that are closer, the coating is more likely to protect the iron-containing wire over a greater temperature range. Further, when the CTE of the anode wire more closely matches the CTE of the cathode tube, better control over anode wire tension can be maintained over temperature extremes, which can reduce spurious counting from vibration, microphonics, or the like. In a particular embodiment, the CTE of the iron-containing may be no more than 40% different from the CTE of the coating, and in a more particular embodiment, no more than 30% different from the CTE of the coating. For example, platinum has a CTE that is closer to the CTE of 446 stainless steel (approximately 16% higher than the CTE of platinum) than the CTE of 17-7 stainless steel (approximately 70% higher than the CTE of platinum). Still, a platinum-coated 17-7 stainless steel anode wire may provide a more robust anode wire than other stainless steel anode wires without any coating. Other coatings can be used. In particular, the CTE of 310 stainless steel is approximately 1% lower than the CTE of gold. Thus, a gold-cladded 310 stainless steel anode wire has relatively closed matched CTEs. After reading this specification, skilled artisans will be able to select the combination of materials for the iron-containing wire and metal coating for their particular needs or desires. With the metal coating, the iron-containing wire is not directly exposed to the gases, including plasmas, within the sensing element. In a particular embodiment, the material can be clad to the iron-containing containing wire. In an embodiment, the thickness of the material can be thick enough such that a substantially continuous layer is formed along the outer surface of the iron-containing wire, at least for that portion of the iron-containing wire lying within the enclosure 202. In a particular embodiment, the thickness of the material is at least approximately 3 microns. In a further particular embodiment, the thickness of the material is no greater than approximately 30 microns.

When comparing nickel to a noble metal, a nickel may be more susceptible to attack under the conditions experienced when operating the sensing element. Thus, a further embodiment, the anode wire 206 can include a nickel-containing wire with a material including one or more noble metals covering the nickel-containing wire. The selection of materials for the nickel-containing material and the particular noble metal, and the thickness of the coating material are determined using the same considerations as previously discussed with respect to the iron-containing wire.

The composition of gases within the sensing element 200 may or may not include an oxygen-containing gas. Thus, the possible combinations of gasses within the sensing element 200 may be more flexible than in conventional sensing elements. Referring to Table 1, the sensing element 200 can include any of the non-air and air gas compositions. If needed or desired, the pressure can be adjusted by increasing or decreasing the amounts of gases while keeping the relative composition of the gases (for example, mole fractions) approximately constant. In other embodiments, any gas compositions previously described can be used. In another embodiment, the gases within the sensing element may be substantially free of an oxygen-containing gas, and in a further embodiment, the gases can includes an oxygen-containing gas in an amount no greater than approximately 3% by pressure of a total pressure of the plurality of gases. After reading the specification, skilled artisans will appreciate that other gas combinations can be used without deviating from the scope of the concepts as described herein.

In industrial applications, such as downhole well bore applications, ionizing radiation detectors, such as Geiger counters, can be used at operating temperatures of 100° C. to 125° C., or even 185° C. or above (for example, operating temperature can spike to 235° C. or above). Additionally, such detectors can be operated at bias voltages of from 600 VDC to as high as 1200 VDC. In some applications, a plurality of sensing elements, such as Geiger-Muller tubes, can be used on a single tool for directional drilling purposes. For instance, the sensing elements can be arranged in sets of 2 to 8 sensing elements. In a particular embodiment, the single tool can include a plurality of sets to provide a total of 8 to 32 sensing elements. In another embodiment, more or fewer sensing elements may be used if needed or desired. Further, the sensing elements do not need to be arranged in sets. If one sensing element fails, the tool may not be steered effectively, and the failed sensing element must be replaced. Thus, the failure of a single sensing element may render the entire tool inoperable.

Conventional self-quenching ionizing radiation detector sensing elements can have a mean time before failure of approximately 40 hours when operated at elevated temperature (such as greater than 100° C.), elevated bias voltage (such as greater than 900 VDC), or any combination thereof. Where a plurality of sensing elements is used, lifetimes may be inconsistent, making drilling interruptions even more frequent. The introduction of oxygen into a sensing element, such as a Geiger-Mueller tube, has been considered disadvantageous by those skilled in the art. Specifically, it has been thought that air would further degrade the lifetime of a self-quenching sensing element, for example, by consuming a portion of a quenching gas.

Figure 4:
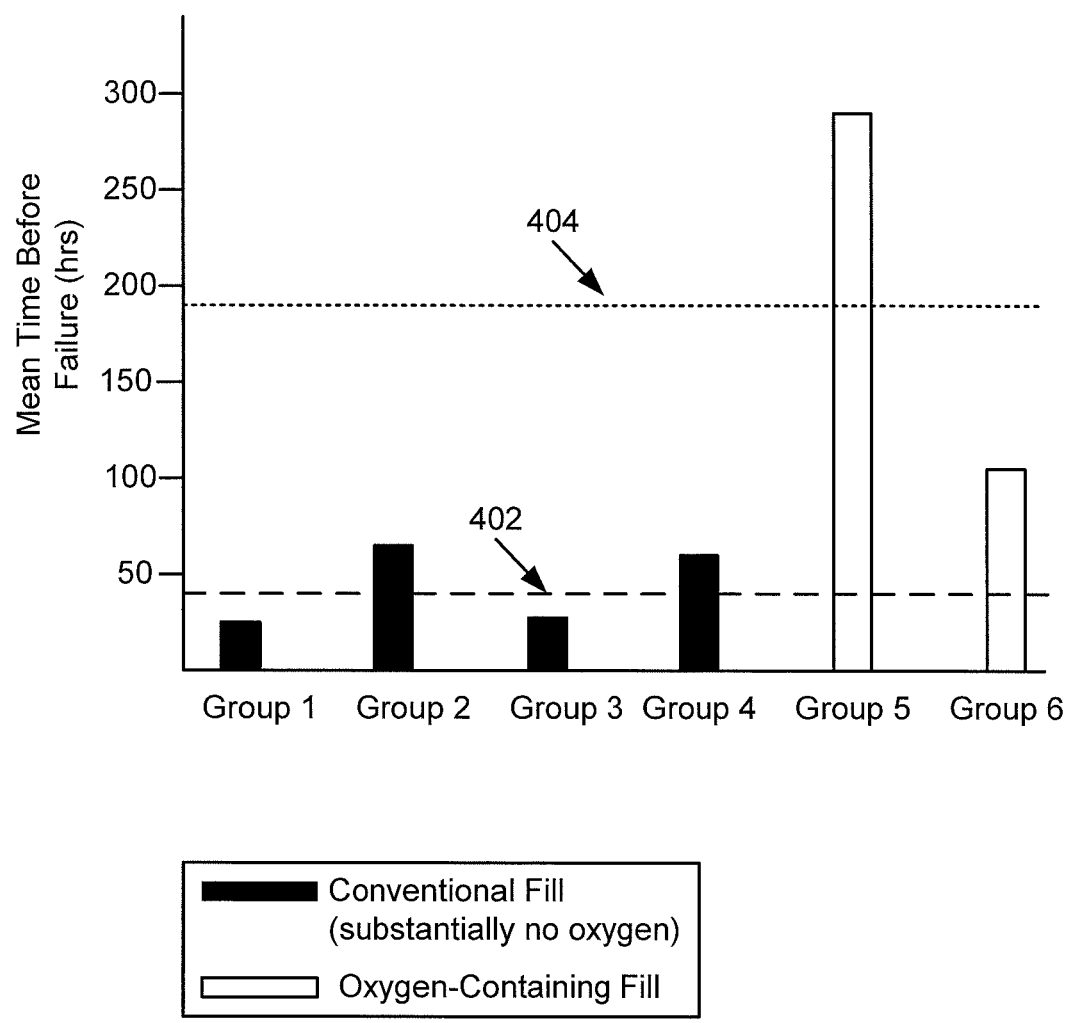
FIG. 4 is a chart illustrating examples of lifetimes of ionizing radiation detection systems.

Unexpectedly, however, it has been found that mean time before failure in self-quenching sensing elements containing an oxygen-containing gas exceeds conventional self-quenching sensing elements and that even lifetimes at a low end of a distribution of self-quenching sensing elements containing an oxygen-containing gas is not significantly lower than conventional sensing elements. For example, as shown in FIG. 4, average mean time before failure 402 for standard fill (substantially no oxygen-containing gas) Geiger-Mueller tubes in Groups 1-4 operated at 1050 V DC and approximately 185° C. was approximately 40 hours. Conversely, Geiger-Mueller tubes in Groups 5 and 6, which included approximately 6719 Pa (50 mm Hg) air in a plurality of gases having a total pressure of 63061.5 Pa (473 mm Hg) were found to exhibit a mean time before failure that was significantly longer than the standard fill tubes in Groups 1-4, and an average mean time before failure 404 that was more than double that of the standard fill tubes in Groups 1-4.

With respect to embodiments directed to sensing elements having anodes that include a noble metal, nickel, or a combination thereof, such anode can be exposed to the gases, including plasmas, for a longer time before the anode fails. The anode composition may allow a wider range of gas compositions within the sensing elements. Therefore, in the case of a relatively small leak where air enters the enclosure of the sensing element, the radiation detector can be operated for a longer time period before failing, as compared to a convention iron-containing anode wire without a material covering the iron-containing material within the wire.

EXAMPLES

Figure 5:
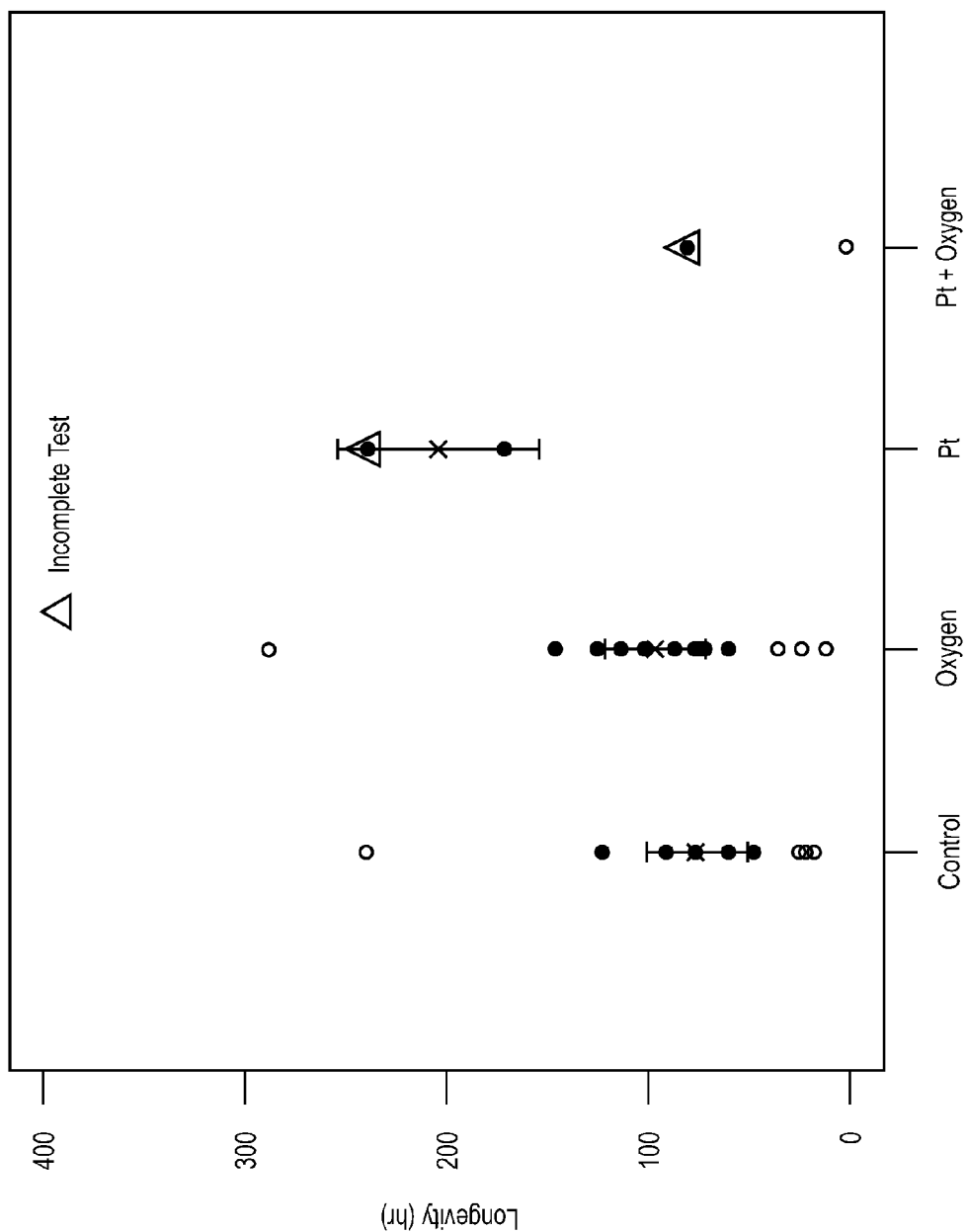
FIG. 5 is a plot of data regarding different configurations of ionizing radiation detection systems.

The concepts described herein will be further described in the following examples, which do not limit the scope of the invention described in the claims. Data from the examples is listed in the table below and are illustrated in FIG. 5. The asterisked values are explained in more detail with respect to Example 1. Some of the parameters below have been approximated for convenience.

TABLE 4

Data for Examples

| Construction | Control Lifetime (hrs) | Oxygen Lifetime (hrs) | Pt Lifetime (hrs) | Pt + Oxygen Lifetime (hrs) |
|---|---|---|---|---|
|  | 25 | 102 | 169 | 2 |
|  | 24 | 288 | 239 | 82 |
|  | 22 | 102 |  |  |
|  | 92 | 146 |  |  |
|  | 17 | 114 |  |  |
|  | 48 | 72 |  |  |
|  | 60 | 76 |  |  |
|  | 123 | 123 |  |  |
|  | 75 | 75 |  |  |
|  | 75 | 87 |  |  |
|  | 60 | 123 |  |  |
|  |  | 125 |  |  |
|  |  | 60 |  |  |
|  |  | 87 |  |  |
|  |  | 87 |  |  |
|  |  | 24 |  |  |
|  |  | 36 |  |  |
|  |  | 12 |  |  |
| Average (hr) | 76* | 97* | 204 |  |
| Std. Dev. (hr) | 25* | 25* | 50 |  |
| Std. Dev. (% of average) | 33 | 26 | 24 |  |

Example 1

Example 1 demonstrates that a mixture of an ionizing gas, a halogen-containing gas, and an oxygen-containing gas within a self-quenching sensing element has an unexpectedly longer average lifetime as compared to a self-quenching sensing element without the oxygen-containing gas.

The control ionizing radiation detection system included Geiger-Mueller tubes having a 17-7 stainless steel anode wire and filled with a Penning mixture and are referred to as "Control" in the Table. More particularly, the Geiger-Mueller tubes included 400 mm Ne, 0.4 mm Ar, and 1.8 mm $Br_2$. Another ionizing radiation detection system is substantially identical to the control ionizing radiation system except that oxygen was added to the gas mixture within the Geiger-Mueller tubes and are referred to "Oxygen" in the Table. The gas mixture was 400 mm Ne, 0.4 mm Ar, and 1.8 mm $Br_2$, and 20 mm $O_2$.

Both sets of Geiger-Mueller tubes were designed for operation at 750 V. Longevity tests on the tubes were run at 1050 V and 185° C. until the tubes failed. The higher voltage for the tests (higher than the designed operating voltage) was selected to shorten the test cycles to allow more data to be collected. The lifetimes of the tubes tested are expected to have been longer when the tubes operate at 750 V. U.S. Pat. No. 4,684,806 and U.S. Pat. No. 3,892,990 disclose test operating voltages. For the purposes of the examples, the life of a Geiger-Mueller tubes ends when there is a loss of stable counting, such as overcounting radiation, undercounting radiation, signal spikes, no signal, an electrical open or short, or counts that do not correspond to radiation. The time of failure was recorded in hours after the start of the test. The data in the table was collected for the Control and Oxygen tubes.

As can be seen in FIG. 5, there are gaps between some of the tubes that failed at relatively shorter times and the main distribution of times and between the longest time and the main distribution of times. For the Control set, the gap is between 24 hours (highest value for the early failures) and 60 hours (lowest time within the main distribution), and for the Oxygen set, the gap is between 36 (highest value for the early failures) and 75 hours (lowest time within the main distribution). With respect to the longest times, for the Control set, the gap is between 240 hours (highest value obtained) and 123 hours (highest time within the main distribution), and for the Oxygen set, the gap is between 288 (highest value obtained) and 146 hours (highest time within the main distribution). The data points for the relatively shorter times and longest times are depicted as annular rings. Because of the gaps, the three shortest and the longest times were not used to determine the averages and standard deviations for the Control and Oxygen sets, which is why the values for the averages and standard deviations are noted with asterisks.

The data in the Table shows that the Oxygen set of tubes are clearly superior with respect to longevity as compared to the Control set of tubes. Such a result was unexpected as the presence of oxygen, particularly in view of the high voltage and elevated temperature, would have been predicted to shorten the longevity due to the potential of oxidizing the stainless steel anode wire. To the contrary, the average longevity of the Oxygen set of tubes was over 25% longer than the average longevity of the Control set of tubes. Thus, the Oxygen set of tubes provide longer times to fail and can be used in the field for a longer period of time before needing replacement.

Example 2

Example 2 demonstrates that oxidation resistant materials for the anode wire help to extend the longevity of the tubes. The Control and Oxygen sets of tubes have been previously described. Two additional sets of tubes are substantially identical except that the stainless steel wire is coated with platinum. The set referred to as "Pt" used the gas mixture as previously described with respect to the Control set, and the set referred to "Pt+Oxygen" used the gas mixture as previously described with respect to the Oxygen set.

The data in the Table clearly shows that the Pt set of tubes have superior longevity as compared to the Control set of tubes. Note that at 239 hours, one of the tubes had not yet failed. Thus, the average for the Pt set of tubes would likely be higher than because one of the tubes has not failed. The Pt set of tubes have an average longevity that is more than 150% better than the Control set of tubes.

With respect to the Pt+Oxygen set of tubes, the preliminary data appears promising. One tube failed at two hours; however, the tube failed for a reason other than failure of the anode wire, and therefore, that data point is illustrated as an annular ring. The other tube did not have a failure at 82 hours. More experimentation is needed for the Pt+Oxygen set of tubes in order to make a conclusion regarding the longevity of Pt+Oxygen tubes.

Many different aspects and embodiments are possible. Some of those aspects and embodiments are described below. After reading this specification, skilled artisans will appreciate that those aspects and embodiments are only illustrative and do not limit the scope of the present invention. Additionally, those skilled in the art will understand that some embodiments that include analog circuits can be similarly implemented using digital circuits, and vice versa.

According to a first aspect, an ionizing radiation detection system can include a self-quenching sensing element having a substantially sealed enclosure containing a plurality of gases. The plurality of gases can include an ionizing gas to ionize in response to receiving a particle of ionizing radiation. The plurality of gases can also include a halogen quenching gas. Further, the plurality of gases can include an oxygen-containing gas in an amount of at least approximately 3% by pressure of a total pressure of the plurality of gases. For example, the oxygen-containing gas can be present in an amount of at least approximately 5% by pressure of the total pressure.

In an embodiment of the first aspect, the oxygen-containing gas can include air. For instance, the plurality of gases can include air in an amount at least approximately 10% by pressure of the total pressure of the plurality of gases. The air can include, for example, nitrogen, water vapor, carbon dioxide, argon, or any combination thereof. In another example, the air can consist essentially of dry air.

In another embodiment of the first aspect, the oxygen-containing gas can include diatomic oxygen gas or ozone.

In another embodiment of the first aspect, the ionizing gas can include a noble gas. For instance, the noble gas can include helium, neon, argon, krypton, xenon, or any combination thereof, such as a Penning mixture. In a particular embodiment, the noble gas can include a first noble gas and a second noble gas having a lower ionization potential than the first noble gas. The second noble gas is present in an amount of at least approximately 0.1% by pressure of the total pressure of the plurality of gases.

In another embodiment of the first aspect, the halogen quenching gas can have a lower ionization potential than the second noble gas. For example, the halogen quenching gas can include a bromine-containing gas or a chlorine-containing gas. In a particular embodiment, the halogen quenching gas can include the bromine-containing gas in an amount of at least approximately 0.25% by pressure, such as from approximately 0.4% to approximately 1% by pressure of the total pressure.

In another embodiment of the first aspect, the sensing element can include a Geiger-Mueller tube. In another embodiment, the sensing element can include an anode comprising an iron-containing wire, and in a further embodiment, the sensing element can include an anode comprising a nickel-containing wire.

According to a second aspect, an ionizing radiation detection system can include a self-quenching Geiger counter sensing element having a substantially sealed enclosure containing a plurality of gases. The plurality of gases can include an ionizing gas to ionize in response to receiving a particle of ionizing radiation. The plurality of gases can also include a halogen quenching gas. The plurality of gases can include an oxygen-containing gas in an amount at least approximately 3% by pressure of a total pressure of the plurality of gases. The sensing element can also include a cathode and an anode that includes a material that oxidizes in the presence of the oxygen-containing gas.

In another embodiment of the second aspect, the cathode can include an inner surface of the enclosure. The inner surface can be substantially coated with a metal or graphite. The metal can include platinum.

In another embodiment of the second aspect, the anode can comprise an iron-containing wire, and in a further embodiment, the anode can comprise a nickel-containing wire In another embodiment of the second aspect, the total pressure can be less than atmospheric pressure. In an example, a partial pressure of the oxygen-containing gas can be from approximately 1333 Pa to approximately 26664 Pa.

For example, a partial pressure of the oxygen-containing gas can be at least approximately 5332 Pa and the oxygen-containing gas can include air. The air can consist essentially of dry air. In another example, the partial pressure of the oxygen-containing gas can be from approximately 1333 Pa to approximately 6666 Pa and the oxygen-containing gas can include substantially pure diatomic oxygen.

In another embodiment of the second aspect, a partial pressure of the quenching gas can be from approximately 67 Pa to approximately 1333 Pa.

In another embodiment of the second aspect, a partial pressure of a minority component of the ionizing gas can be from approximately 20 Pa to approximately 200 Pa.

According to a third aspect, an ionizing radiation detection system can include a plurality of self-quenching Geiger-Mueller sensing elements. Each sensing element can have a substantially sealed enclosure containing a plurality of gases. The plurality of gases can include an inert ionizing gas to ionize in response to receiving a particle of ionizing radiation, a halogen quenching gas and an oxygen-containing gas. The plurality of Geiger-Mueller sensing elements can have a mean time before failure of at least approximately 95 hours at a temperature of approximately 100° C. and a bias voltage of approximately 1050 V DC.

In an embodiment of the third aspect, the Geiger-Mueller sensing elements can have a mean time before failure of at least approximately 95 hours at a temperature of at least approximately 185° C. and a bias voltage of approximately 1050 V DC.

In another embodiment of the third aspect, the oxygen-containing gas can be present in an amount of at least approximately 3% by pressure of a total pressure of the plurality of gases.

In another embodiment of the third aspect, the plurality of sensing elements can include at least 2 sensing elements. In another embodiment of the third aspect, the plurality of sensing elements includes no more than 32 sensing elements. In another embodiment of the third aspect, the plurality of sensing elements can be adapted to be coupled to a well bore drilling apparatus.

According to a fourth aspect, a method can include evacuating a Geiger-Mueller sensing element having an enclosure. The method can also include adding a plurality of gases to the enclosure. The plurality of gases can include an ionizing gas, a halogen quenching gas, and an oxygen-containing gas. The oxygen-containing gas is present in an amount of at least approximately 3% by pressure of a total pressure of the ionizing gas, the quenching gas, and the oxygen-containing gas.

In an embodiment of the fourth aspect, the method can also include, before adding the ionizing gas and the quenching gas, substantially coating an inner surface of the enclosure with a cathode material. The cathode material can include a metal or graphite, such as platinum.

In another embodiment of the fourth aspect, the method can also include, before adding the ionizing gas and the quenching gas, providing an anode within the enclosure, wherein the anode is electrically isolated from the inner surface.

In another embodiment of the fourth aspect, the enclosure can be evacuated after substantially coating the inner surface and before adding the ionizing gas and the quenching gas.

In another embodiment of the fourth aspect, the method can also include pre-mixing the ionizing gas and the quenching gas and adding the pre-mixed ionizing and quenching gases to the enclosure before adding the oxygen-containing gas to the enclosure.

In another embodiment of the fourth aspect, the method can also include substantially sealing the enclosure after adding the oxygen-containing gas.

In another embodiment of the fourth aspect, the oxygen-containing gas can include air. The air can consist essentially of dry air. In another embodiment of the fourth aspect, the oxygen-containing gas can include substantially pure diatomic oxygen.

In another embodiment of the fourth aspect, the method can also include providing an anode within the enclosure. The anode can comprise a material that oxidizes in the presence of the oxygen-containing gas. For example, the anode can include an iron-containing wire or a nickel-containing wire.

According to a fifth aspect, an ionizing radiation detection system can include a self-quenching sensing element having a substantially sealed enclosure containing a plurality of gases. The plurality of gases can include an ionizing gas to ionize in response to receiving a particle of ionizing radiation, and a halogen quenching gas. The sensing element can further include an anode including a noble metal, nickel, or any combination thereof.

In an embodiment of the fifth aspect, the anode can include platinum. In another embodiment, the anode can include palladium or gold. In still another embodiment, the anode can include ruthenium, rhenium, iridium, or osmium. In a further embodiment, the anode can include an iron-containing wire and a material surrounding the wire, wherein the material can include the noble metal, nickel, or any combination thereof. In a particular embodiment, the anode can include a nickel-containing wire, such as a nickel alloy. In a more particular embodiment, the nickel alloy can include a refractory metal. In an even more particular embodiment, the refractory metal can include titanium.

In another embodiment, of the fifth aspect, the plurality of gases can be substantially free of an oxygen-containing gas. In still another embodiment, the plurality of gases can include an oxygen-containing gas in an amount no greater than approximately 3% by pressure of a total pressure of the plurality of gases. In yet another embodiment, the plurality of gases can include an oxygen-containing gas in an amount of at least approximately 3% by pressure of a total pressure of the plurality of gases.

In a further embodiment of the fifth aspect, the ionizing gas can include helium, neon, argon, krypton, xenon or any combination thereof. In a particular embodiment, the inert gas can include a Penning mixture. In a more particular embodiment, the ionizing gas can include a first noble gas and a second noble gas having a lower ionization potential than the first noble gas, wherein the second noble gas is present in an amount of at least approximately 0.1% by pressure of the total pressure. In an even more particular embodiment, the halogen quenching gas can have a lower ionization potential than the second noble gas.

In another embodiment of the fifth aspect, the halogen quenching gas can include a bromine-containing gas or a chlorine-containing gas. In a particular embodiment, the halogen quenching gas can include a bromine-containing gas in an amount of at least approximately 0.5% by pressure of the total pressure. In still another embodiment, the sensing element can include a Geiger-Mueller tube.

Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. An ionizing radiation detection system comprising:
a self-quenching sensing element having a substantially sealed enclosure containing a plurality of gases, the plurality of gases including:
an ionizing gas to ionize in response to receiving a particle of ionizing radiation;
a halogen quenching gas; and
an oxygen-containing gas in an amount of at least approximately 3% by pressure of a total pressure of the plurality of gases.

2. The ionizing radiation detection system of claim 1, wherein the oxygen-containing gas is present in an amount of at least approximately 5% by pressure of a total pressure of the plurality of gases.

3. The ionizing radiation detection system of claim 1, wherein the ionizing gas includes a Penning mixture.

4. The ionizing radiation detection system of claim 3, wherein the ionizing gas includes a first noble gas and a second noble gas having a lower ionization potential than the first noble gas, wherein the second noble gas is present in an amount of at least approximately 0.1% by pressure of the total pressure.

5. The ionizing radiation detection system of claim 1, wherein the halogen quenching gas includes a bromine-containing gas or a chlorine-containing gas.

6. The ionizing radiation detection system of claim 4, wherein the sensing element comprises a Geiger-Mueller tube.

7. The ionizing radiation detection system of claim 1, wherein the sensing element includes an anode comprising an iron-containing wire.

8. A method comprising:
evacuating an enclosure for a Geiger-Mueller sensing element having an enclosure;
adding a plurality of gases to the enclosure, the plurality of gases including an ionizing gas, a halogen quenching gas and an oxygen-containing gas, wherein the oxygen-containing gas is present in an amount of at least approximately 3% by pressure of a total pressure of the ionizing gas, the quenching gas, and the oxygen-containing gas.

9. The method of claim 8, further comprising, before adding the ionizing gas and the quenching gas, substantially coating an inner surface of the enclosure with a cathode material.

10. The method of claim 9, further comprising, before adding the ionizing gas and the quenching gas, providing an anode within the enclosure, wherein the anode is electrically isolated from the inner surface.

11. The method of claim 8, further comprising pre-mixing the ionizing gas and the quenching gas and adding the pre-mixed ionizing and quenching gases to the enclosure before adding the oxygen-containing gas to the enclosure.

\* \* \* \* \*